Nov. 4, 1924.  1,514,012

F. RAMBUSCHECK

ROTATING CUTTING TOOL FOR WORKING METAL, CIRCULAR SAWS, AND THE LIKE

Filed March 25, 1922

Inventor:
F. Rambuscheck
By Lawrence Langner
Attorney

Patented Nov. 4, 1924.

1,514,012

UNITED STATES PATENT OFFICE.

FRIEDRICH RAMBUSCHECK, OF BERLIN N., GERMANY.

ROTATING CUTTING TOOL FOR WORKING METAL, CIRCULAR SAWS, AND THE LIKE.

Application filed March 25, 1922. Serial No. 546,693.

*To all whom it may concern:*

Be it known that I, FRIEDRICH RAMBUSCHECK, residing at Ostenderstr. 1, Berlin N., in the German Republic, have invented certain new and useful Improvements in Rotating Cutting Tools for Working Metal, Circular Saws, and the like, of which the following is a specification.

This invention has reference to rotating cutting tools for metal working operations which penetrates into the piece of work transversely with relation to its axis of rotation, such as circular saws, shaping tools, and the like, and it is particularly distinguished from tools of this kind as heretofore constructed by the fact that the cutting faces of the cutting teeth are rearwardly inclined relatively to the direction of rotation. By this means the life of the teeth is increased and much greater efficiency is produced in the working of metals of various kinds, that is to say not only in the treatment of copper and similar metals, but also in working iron and steel.

Figure 1:
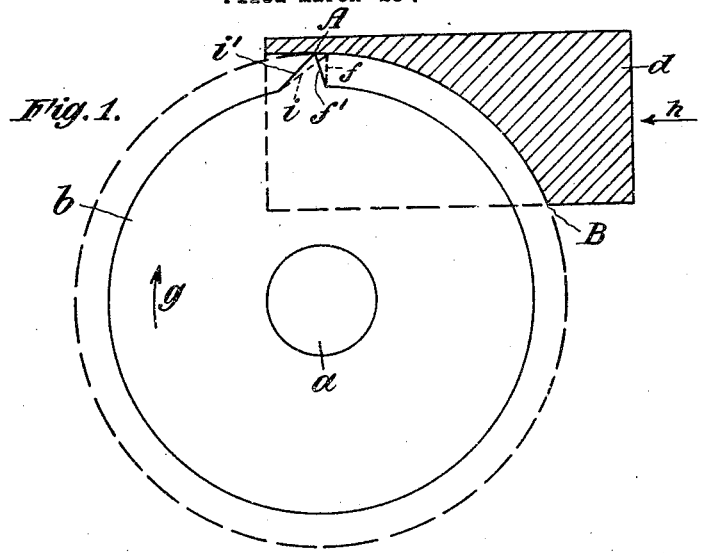
Figure 2:
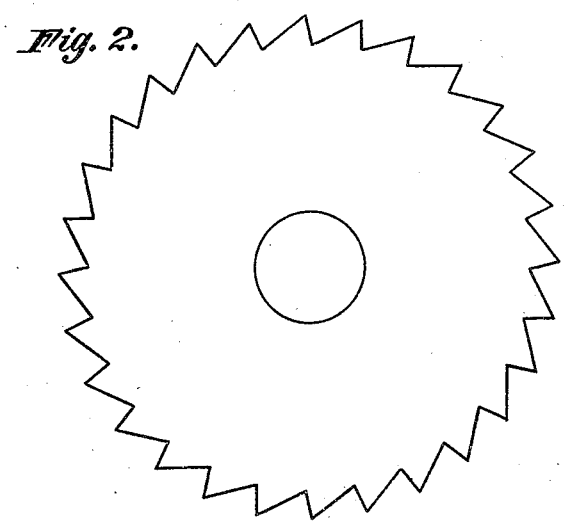
Figure 3:
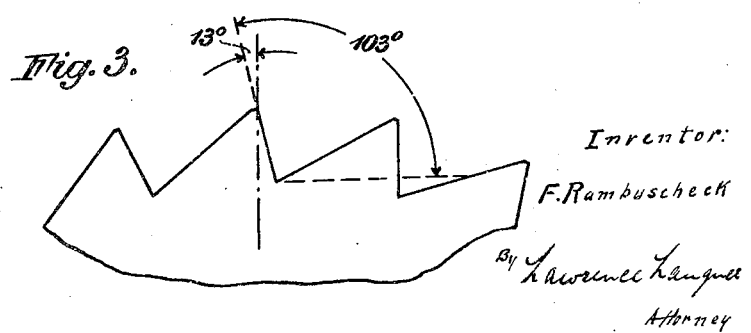

My invention will be understood from the following specification and drawings in which latter Figure 1 illustrates an embodiment of my invention by way of example in a conventional manner in the operative position, only one tooth being shown. Figure 2 is an elevation of the tool. Figure 3 shows part of the tool on an enlarged scale.

The tool $b$ which may be assumed to be mounted upon the shaft $a$, and which may consist of a circular saw, is utilized, for instance, for the cutting of a piece of work indicated conventionally at $d$, and which may, for instance, be constituted by a four-cornered iron bar.

In tools of the kind described it has been a foregone conclusion heretofore that the operating face of the cutting teeth, whether integral with the body of the tool or made from a separate piece and inserted therein, should be arranged in radial planes relatively to the axis, so as to substantially assume the position indicated at $f$ in dotted lines. This principle was based upon the assumption that tools the cutting faces of which are forwardly inclined in the cutting direction are pushed or drawn into the piece of work, while tools with cutting faces rearwardly inclined from said radial direction were thought to be forced away from the piece of work.

This assumption and the reasons adduced for it, must be admitted to be justified only in the case of the cutting down from the piece of work of layers, the thickness of which is only small as compared with the diameter of the tool.

However, conditions are entirely different with tools which, like circular saws deeply engage into the piece of work or which, like shaping tools, are dug into the piece of work with their entire surface. With tools of the kind referred to the conditions under which the cutting tooth is caused to operate during its movement along its path of operation in the interior of the piece of work, and consequently the strains generated thereby are different and of extraordinarily varying nature. At the point A, where the tooth during the revolution of the saw in the direction of the arrow $g$ enters in the piece of work $d$ the movement of the tooth is entirely or approximately in the direction of the feeding movement in the direction of the arrow $h$, while on the other hand, at the point, where the tooth leaves the piece of work, that is to say at the point B, the direction of movement of the tooth takes place approximately at right angle to the feeding movement. While the radially arranged cutting edge $f$ at the point A is substantially at right angle to the feeding movement, it will be approximately in parallel relation to the feeding movement at the point B. In proportion, therefore, of the movement of the tooth from the point A towards the point B, the feeding movement will cause the section of the piece of work to be severed to travel in the direction of the cutting face, and the greater will be the rearwardly bending action which is produced upon the tooth by the portion of the material engaging with the interstice in front of the tooth, so that the cutting tooth operates in a manner similar to a tooth with forwardly directed cutting face with the tendency of digging or being drawn into the material of the piece of work. By this means the tooth is at the same time bent back and is pushed outwards, and inasmuch as the tooth is not completely rigid it is thereby the more readily drawn into the material of the piece of work, so that it has to overcome a still greater resistance than the resistance merely depending upon the feeding movement; by operating in this manner there is the tendency of drawing the tooth more and more away from the axis of the tool in consequence of the increasing wedging action with an increased liability of breaking the tooth. This difficulty is still further increased by the fact that during the forward travel of the tooth from A to B the recess between the teeth is filled with shavings at a constantly increasing ratio, thereby preventing the newly produced shavings from entering into said recess, and assisting the dangerous wedging action. In accordance with the action of the cutting edge hereintofore described the most suitable tool would be a tool with adjustable cutting edges, and in which each cutting edge would be capable of adjustment in accordance with the feed of the material of the piece of work at the time being, and in accordance with the direction of this feed with relation to the particular fraction of the path of movement of the tooth that comes into operation at the time being. This ideal requirement it is almost impossible to accomplish; yet, an extraordinary important advantage may be obtained by providing a tool in which all cutting edges are ground under the most favorable angle, that is to say, the angle corresponding to the position at the moment of maximum strain which results in an edge which, instead of being radially directed as shown at $f$, possesses a rearwardly inclined position $f'$. A cutting edge ground in this manner upon starting to engage with the material of the piece of work would operate in a less favorable manner than a radially directed edge; but this is of no great importance inasmuch as the cutting edge, as long as it still moves approximately in the feeding direction upon penetrating the piece of work is intended to sever from the piece of work a chip, the thickness of which starts with zero and increases but very slowly. In the ratio, however, as the thickness of the chip increases the position of the cutting edge becomes more and more favorable, so that, considering the amount of work to be performed at the particular fraction of time and the advantage of the particular corresponding position of the edge, the strain upon the tooth remains substantially unchanged, and the tool is exposed in all its operating parts to an approximately uniform strain or load. This is not the case with tools having radially positioned cutting faces, inasmuch as with such kind of tools the cutting face has its most favorable operating position, when it is disposed so as to be required to perform the minimum of work, its position and the resulting capacity of doing useful work becomes less favorable as its operation proceeds, and the position of the blade has become the least favorable at the point at which the tooth is called upon to perform the maximum of efficient work, and at which it is exposed to the greatest strain. In consequence thereof with the circular saws as heretofore constructed for example the majority of fractures occur just as the point which is situated at a short distance from the point where the sawing teeth leave the piece of work.

This overstrain is avoided in my novel form of teeth, the degree of efficiency of the teeth and the amount of the strain to which each tooth is exposed being distributed as uniformly as possible along the entire extent of its operating path within the piece of work. Furthermore than that, in view of the backward inclination of the operating edge the point of the tooth which is exposed to the greatest strain, is better protected, and is most favorably positioned, and, even with all conditions otherwise unchanged, the angle formed by the cutting face $f'$ according to this invention and the corresponding rear edge $i'$ of the blade is larger than the angle formed by the radial cutting face $f$ and its corresponding rear cutting edge $i$. By this means the strength of the tooth and its resistance against the forces which tend to draw it into the material of the piece of work are increased. In the practice of my invention it has been ascertained that with tools according to this invention, aside from the advantage of greatly increased durability, a far higher efficiency and a multiple of the output is obtained in the normal operation of the tool than in the case of ordinary radially ground tools of the kind described. The greater amount of operating power required by the new tools is far more than compensated by the rapidity of operation and the very great efficiency and utilization of the operating parts in machines of this kind.

From the conditions prevailing in the operation of my improved tool as hereinbefore described and as shown on the accompanying drawing it will be apparent that, as compared with devices in which the strain on the teeth tends to force them into the piece of work, the action of the teeth is far more favorable and efficient, and in accordance therewith the amount of rearward inclination of the cutting face is preferably comparatively large, thereby increasing the durability of the tool even through the amount of power required for the operation should have to be somewhat augmented. Otherwise the angle of rearward inclination depends upon the qualities of the piece of work to be operated upon. Thus, for instance in the case of circular saws for operating on copper an angle of ten degrees has proved to yield very satisfactory results, while in the case of iron and steel an angle of about 13 degrees has been found to be most practicable. The practical limits for the various inclinations being between 8 and 15 degrees. The advantages obtained by the new construction of tooth decrease with the decrease of the angle of inclination below ten degrees.

It is evident that my invention may be embodied in a great variety of cutting tools other than those illustrated in the drawings and hereinbefore referred to, and modifications may occur to those skilled in this particular art to suit the convenience of the user, without deviating from the spirit of my invention as set forth in the claims hereunto annexed.

I claim:—

1. A rotatable cutting tool for working on metal and adapted for being fed in the work piece transversely to its axis of rotation having cutting teeth with cutting edges inclined rearwardly relative to the radial direction at an angle of substantially 13 degrees.

2. A rotatable cutting tool for working on metal having cutting teeth with cutting edges inclined rearwardly at an angle between 8 and 15 degrees with relation to the radial direction.

In testimony whereof I affix my signature in presence of two witnesses.

FRIEDRICH RAMBUSCHECK.

Witnesses:
ARTHUR SCHROEDER,
JOHN W. BULKLEY.